(12) United States Patent
Previdi et al.

(10) Patent No.: US 7,974,285 B2
(45) Date of Patent: Jul. 5, 2011

(54) METHOD AND APPARATUS FOR IDENTIFYING AN EGRESS POINT TO A NETWORK LOCATION

(75) Inventors: Stefano Benedetto Previdi, Rome (IT); Clarence Filsfils, Brussels (BE); Jean-Philippe Vasseur, Dunstable, MA (US); Benoit Claise, Crisnee (BE); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1669 days.

(21) Appl. No.: 11/045,015

(22) Filed: Jan. 26, 2005

(65) Prior Publication Data

US 2006/0165013 A1 Jul. 27, 2006

(51) Int. Cl.
*H04L 12/28* (2006.01)
*H04L 12/56* (2006.01)
*G06F 15/173* (2006.01)

(52) U.S. Cl. ......... 370/392; 370/254; 370/401; 709/238

(58) Field of Classification Search .......... 370/254–351, 370/389–392, 394–397, 236–252, 400–469; 709/223–224, 242–247, 227–238
See application file for complete search history.

(56) References Cited

U.S. PATENT DOCUMENTS

| | | | | |
|---|---|---|---|---|
| 6,954,463 B1 * | 10/2005 | Ma et al. | .................. | 370/401 |
| 7,072,346 B2 * | 7/2006 | Hama | .................. | 370/395.53 |
| 7,136,374 B1 * | 11/2006 | Kompella | .................. | 370/352 |
| 7,292,569 B1 * | 11/2007 | Smith et al. | .................. | 370/383 |
| 7,437,476 B2 * | 10/2008 | Zinin et al. | .................. | 709/238 |
| 7,453,811 B1 * | 11/2008 | Luong et al. | .................. | 370/237 |
| 7,467,226 B2 * | 12/2008 | Luong et al. | .................. | 709/238 |
| 7,558,214 B2 * | 7/2009 | Previdi et al. | .................. | 370/254 |
| 7,742,431 B2 * | 6/2010 | Ng et al. | .................. | 370/254 |
| 2003/0126289 A1 * | 7/2003 | Aggarwal et al. | .................. | 709/242 |
| 2005/0047413 A1 * | 3/2005 | Ilnicki et al. | .................. | 370/392 |
| 2005/0152286 A1 * | 7/2005 | Betts et al. | .................. | 370/255 |
| 2006/0092952 A1 * | 5/2006 | Boutros et al. | .................. | 370/400 |
| 2006/0120288 A1 * | 6/2006 | Vasseur et al. | .................. | 370/235 |
| 2006/0126502 A1 * | 6/2006 | Vasseur et al. | .................. | 370/221 |
| 2006/0153067 A1 * | 7/2006 | Vasseur et al. | .................. | 370/217 |
| 2007/0019676 A1 * | 1/2007 | Kompella | .................. | 370/468 |
| 2007/0058568 A1 * | 3/2007 | Previdi et al. | .................. | 370/254 |
| 2008/0002716 A1 * | 1/2008 | Wiley et al. | .................. | 370/395.21 |

OTHER PUBLICATIONS

Konstantina Papagiannaki, et al., "A Distributed Approach to Measure IP Traffic Matrices", copyright 2004, IMC'04, Oct. 25-27, 2004, Taormina, Sicility, Italy, 14 pgs.

Internetworking Technologies Handbook, Chapter 42, Chapter Goals, "Interior Gateway Routing Protocol", Oct. 2004, pp. 42.1 to 46.6.

R. Coltun, "The OSPF Opaque LSA Option", Memo, Network Working Group Request for Comments: 2370, dated Jul. 1998, 13 pgs.

* cited by examiner

*Primary Examiner* — Man Phan
(74) *Attorney, Agent, or Firm* — Hickman Palermo Truong & Becker LLP (57) ABSTRACT

A method of identifying an egress point to a network location in a data communications network comprising a plurality of nodes and links there between comprises the step, performed at the identifying node, of receiving a notification through the network advertising an adjacency to a network location. The method further comprises the steps, performed at the identifying node, of deriving from the notification adjacency information and identifying, from the adjacency information, the egress point.

37 Claims, 4 Drawing Sheets

METHOD AND APPARATUS FOR IDENTIFYING AN EGRESS POINT TO A NETWORK LOCATION

FIELD OF THE INVENTION

The present invention generally relates to identification of network components. The invention relates more specifically to a method and apparatus for identifying an egress point to a network location.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols. Elements in the network are typically identifiable by a unique internet protocol (IP) address.

One routing protocol used, for example, in the internet is Border Gateway Protocol (BGP). BGP is used to route data between autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Within each AS the routing protocol typically comprises an interior gateway protocol (IGP) for example a link state protocol such as open shortest path first (OSPF) or intermediate system-intermediate system (IS-IS).

The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

When IS-IS is deployed as IGP in an AS or routing domain it can be configured using separate areas, for example for scaling purposes. In that case a two-level routing hierarchy is used all routers common to an area comprising level 1 routers. The areas are connected via a backbone of level 2 routers. As a result routing within the routing domain is carried out between level 1 routers in a given area and through the level 2 backbone between the areas. Accordingly when a link to a neighboring network node is advertised in an LSP, for example in the form of a prefix originated by a router in a level 1 area, this is "propagated" from level 1 to level 2 and then via the backbone to other level 2 routers. The route is then "leaked" down from the level 2 routers to level 1 routers in other areas. Route propagation and leaking is handled by routers participating in both levels, termed level 1-2 routers. When a prefix is propagated from level 1 to level 2 (or leaked from level 2 to level 1), a restricted amount of information is carried over including the advertised prefix and any associated metric (for example the cost of the link).

When OSPF is deployed as IGP then a similar structure is adopted with slightly different terminology. In particular the backbone is designated area zero and this connects multiple numbered areas via area border routers (ABR).

It is desirable to monitor the flow of traffic on the Internet between network ingress and network egress points for example for the purposes of network wide capacity planning, traffic engineering and destination sensitive billing all of which require a network-wide view of the traffic crossing the network. In particular, for each entry point of the network it is necessary to know where the traffic will exit the network and this information can be stored in a core traffic matrix (TM). One known traffic monitoring system is NetFlow provided by Cisco Systems, Inc, San Jose, Calif. According to this system traffic is classified at the entry point of the network and flow records are exported to a NetFlow collector where an aggregation at the core traffic matrix level is carried out based on additional information available from router configurations and routing tables. NetFlow further provides aggregation based on the BGP next-hop attribute allowing creation of the core TM for all BGP routes, where the egress router of a route is identified using the next-hop attribute.

It is also desirable to produce a core TM directly in a router for link-state IGP prefixes. At present, however, when a routing update crosses an ABR (OSPF) or a level 1-2 router (IS-IS), the information about the originator of the prefix is lost so that the core TM cannot be completed at routers in other areas than the originating router.

In "A Distributed Approach to Measure IP Traffic Matrices" of Papagiannaki et al which is available at the time of writing on the file "Taft-IMC04.pdf" in the directory "nina/Publications/" of the domain "http://berkeley.intel-research-.net/" a monitoring approach is described which relies on additional topology information and requiring exporting flow records and using routing tables and router configuration.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for identifying an egress point to a network location is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Identifying an Egress Point to a Network Location
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for identifying an egress point to a network location in a data communications network comprising a plurality of nodes and links there between. The method comprises the step, performed at an identifying node, of receiving a notification flooded through the network advertising an adjacency to a network location. The method further comprises the steps, performed at the identifying node, of deriving, from the notification, adjacency information, and identifying, from the adjacency information, the egress point.

In other aspects, the invention encompasses a computer apparatus and a computer-readable medium configured to carry out the foregoing steps.

2.0 Structural and Functional Overview

Figure 1:
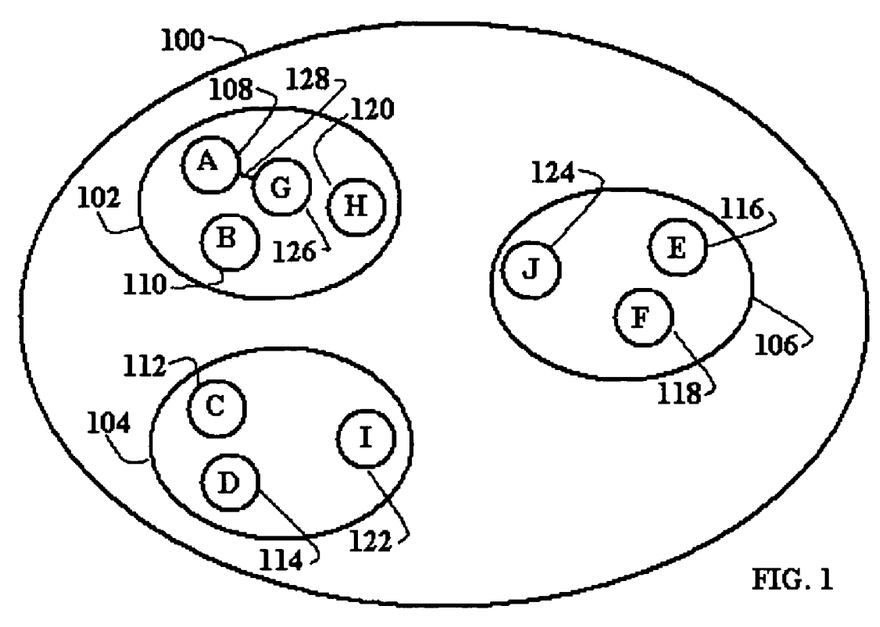
FIG. 1 is a representation of a network supporting IGP.

In overview a method for identifying an egress point to a network location can be understood with reference to FIG. 1 which depicts an illustrative network diagram to which the method is applied. The network, designated 100, includes first, second and third areas 102, 104, 106. Each area includes a plurality of level 1 nodes or routers, node A, reference numeral 108, node B, reference numeral 110, node C, reference numeral 112, node D, reference numeral 114, node E, reference numeral 116, node F, reference numeral 118, where nodes A and B are in the first area 102, nodes C and D are in the second area 104 and nodes E and F are in the third area 106. Each area further includes a respective level 1-2 router node H, reference numeral 120, node I, reference numeral 122, and node J, reference numeral 124. Routing within each area 102, 104, 106 is carried out between level 1 routers. Routing between areas is carried out by the level 1-2 routers. However a level 1 router, for example node A in the first area 102 may advertise via an LSP an adjacency to a prefix denoted here by node G, reference numeral 126 to which node A is connected via link 128. When the information is propagated through the remainder of the routing domain 100 via the level 1-2 routers into the other areas, information is lost including information concerning the identity of the router advertising node G as an adjacency, that is to say notifying node A.

According to the method described herein, therefore, each advertised network location or prefix is associated with the notifying node advertising the prefix in the LSP. As a result the egress point in the network used for that prefix is available and can be provided in the routing table. This information can then be used for statistics collection purposes and traffic statistics on traffic flows going towards any egress point of a network. In particular prefixes are advertised for example in Internet Protocol version 4 (IPv4) or Internet Protocol version 6 (IPv6) with additional information allowing any router in the network to be able to identify the originator of the prefix. As a result even if an advertisement passes through single or multiple area topologies, the required prefix attributes can be maintained as additional information when advertising prefixes across areas.

The additional information can include an originator-ID field identifying the notifying node. In addition the information can include a link-ID field identifying the link which the prefix is reachable through in the case that routes are redistributed into the IGP.

As a result the core TM can be produced directly in a router to which the prefix notification is flooded for all link-state IGP prefixes as a result of which the number of flow records exported to a remote collector is reduced.

It will be appreciated that the approach can be adopted equally in relation to other protocols supported by the IGP for example OSPF or other link state protocols. In the case of OSPF the method described allows originator identity to be maintained even for packets transferred across ABRs.

3.0 Method and Apparatus for Identifying an Egress Point to Network Location

Figure 2:
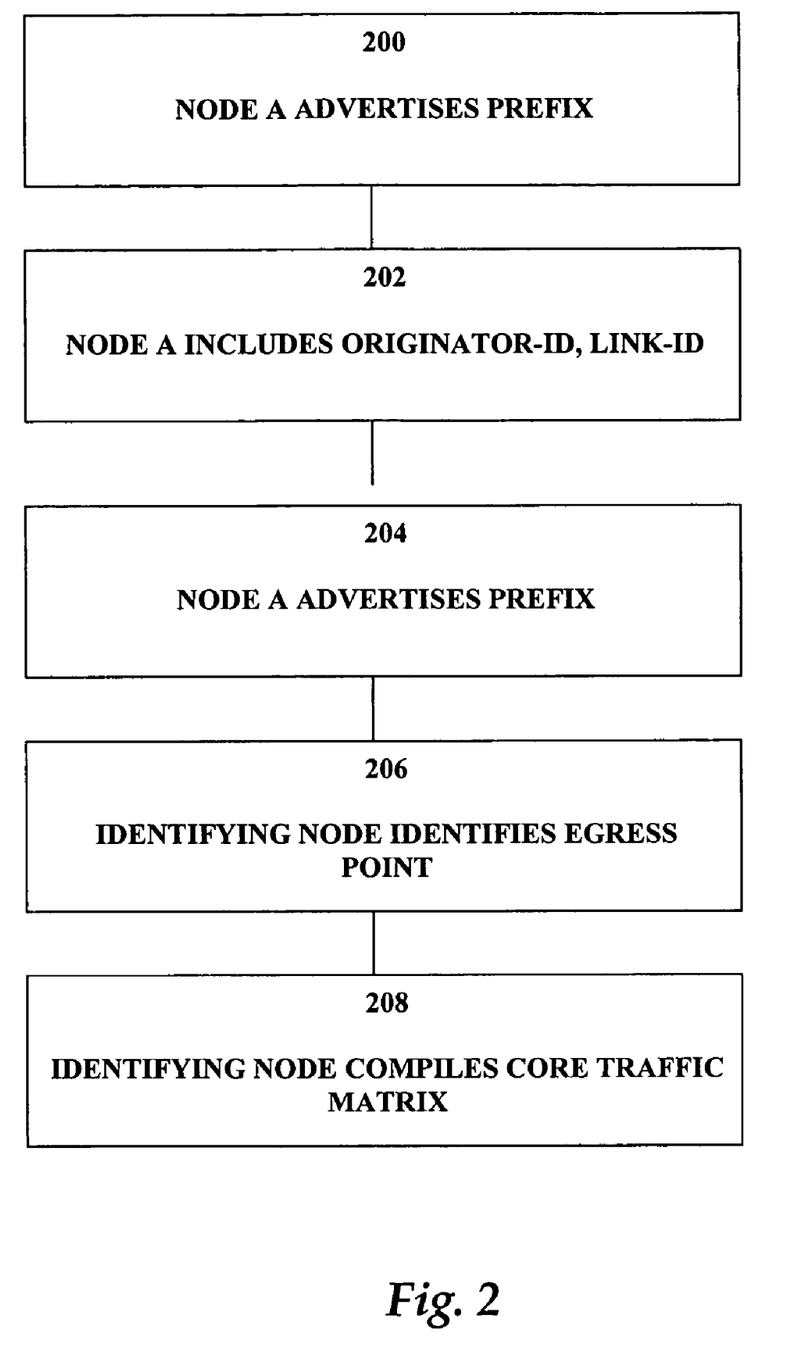
FIG. 2 is a flow diagram illustrating steps performed at a notifying node involved in identifying an egress point to a network location.

The approach described herein can be further understood with respect to FIG. 2 which is a flow diagram illustrating aspects of the method. FIG. 2 is described in the context of the network shown in FIG. 1 although it will be appreciated that any appropriate network can be adopted.

Referring now to FIG. 2, in block 200 an originating or notifying node A intends to advertise an adjacency to a network location comprising a prefix represented by node G by flooding a notification through AS 100 using an LSP. In block 202 node A includes in the LSP, in addition to the prefix information (for example prefix address and mask) and the metric, for example the link cost, additional adjacency information including the originator and link ID. For example in IS-IS the originator-ID and link-ID can be included in the IP-prefix type length value (TLV) field TLV135 of the router LSP. The additional information can be derived as part of the IGP process, where originator-ID is the router-ID itself and link-ID can be manually configured such that IGP can include the value on its routing update.

In block 204, as is conventional in the link state protocols, the LSP is flooded throughout the AS. As a result each router within the AS will receive all other routers' LSPs. Because of the provision of the additional adjacency information, for example as a TLV, this information is also flooded to routers in other areas within the AS. As a result each IP prefix known within the AS is also known with its originator-ID and link-ID. With this information any router computing its RIB can also associate each IP destination to its originator.

Furthermore, where prefixes have been redistributed, the redistributed prefix can be associated with the external link through which it is reachable using link-ID. Accordingly, for any given prefix, each router in the routing domain is able to correlate the originator-ID and link-ID associated with the prefix and has precise information on which router originated the prefix and which link the prefix is reachable through. In the case of an IGP deployment using multi-level/multi-area configuration, because the prefix attributes are preserved across areas, they are still known to any router receiving the IP prefix advertisement.

In block 206, therefore, a receiving node or identifying node identifies the egress point for a prefix by virtue of the originator-ID or link-ID as appropriate.

In block 208 the identifying node compiles a core traffic matrix from this information. Of course the identifying node can derive any appropriate complementary or additional information from the egress point information, as appropriate.

As a result aspects such as network wide capacity planning, traffic engineering and destination sensitive billing can be implemented at each router, providing a distributed model for traffic monitoring. For example in the case of capacity planning and traffic engineering, the core TM, along with the network management tool storing the network topology, dimension all links in the network and potential link or router failure scenarios can be accommodated.

Figure 3:
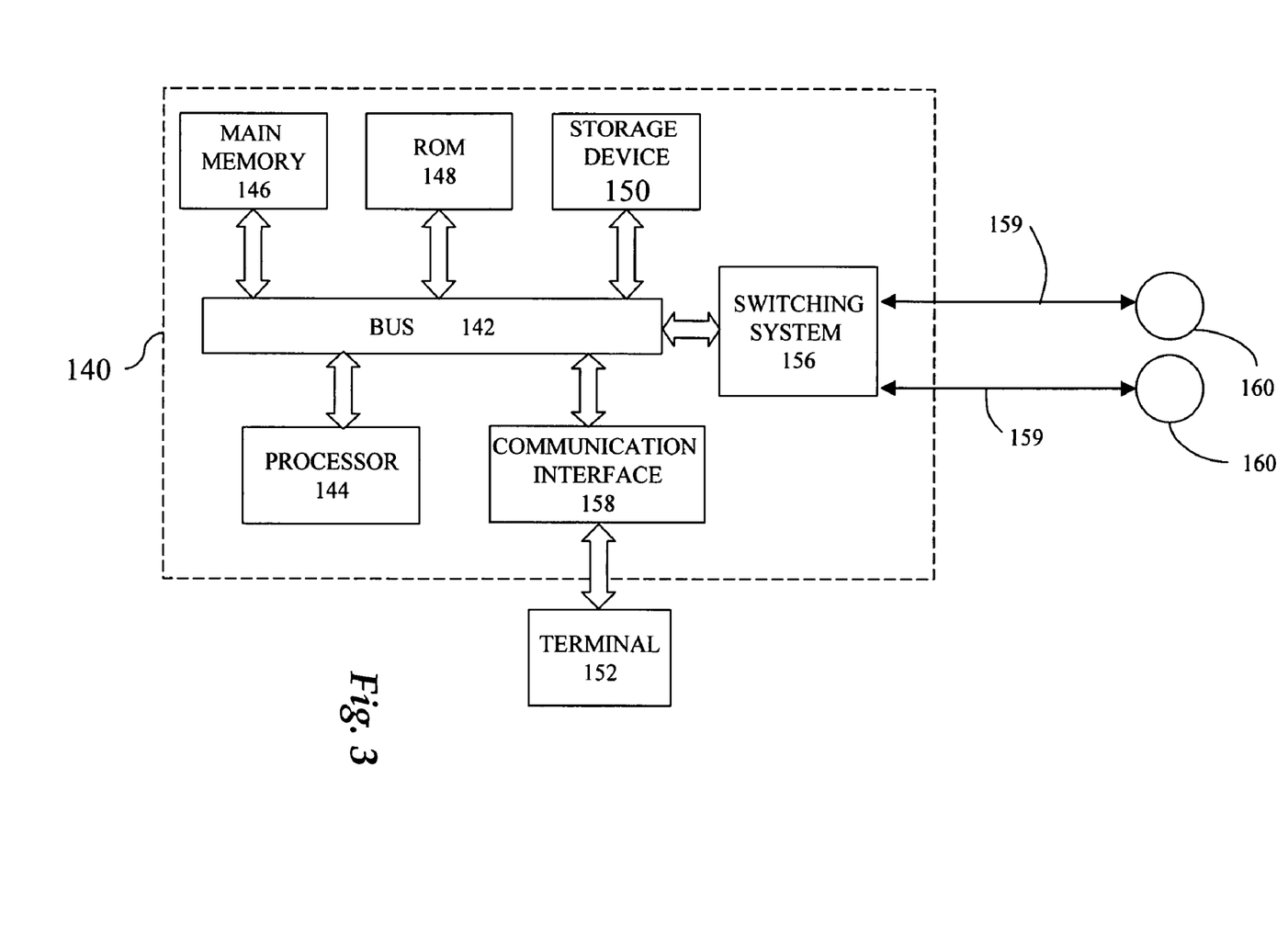
FIG. 3 is a flow diagram illustrating steps involved implementing destination sensitive billing dependent on traffic egress point.

Referring to FIG. 3, which is a flow diagram illustrating implementation of billing dependent on network egress point, in the case of destination sensitive billing, the core TM, by returning the amount of traffic per exit point of the core network, can allow billing schemes to be tailored accordingly. For example ISPs can tailor billing for traffic dependent on the geographic distance it travels. Hence an ISP could bill less for customer traffic that remains in the same country, more for customer traffic exiting in the same continent and more still for traffic crossing an inter-continental link. In block 300, therefore, a node, for example a billing server, receives appropriate traffic information such as the core TM. In block 302 the billing server derives traffic egress points in block 304 the billing server assigns traffic dependent on this egress point to a billing category and in block 306 the billing server implements billing dependent on the billing category in any appropriate manner. It will be appreciated that the billing server can comprise the node determining the core TM or a remote node and that the core TM determining node can derive appropriate billing information and forward the information to a remote billing server, in an alternative embodiment, to allow implementation of the method.

The specific manner in which the adjacency information is included is protocol dependent. As touched upon above, in the case of IS-IS a subTLV is included in TLV-135 including:
SubTLV Type: <to be assigned>
Length: <variable>
Value:
Flags: 4 bytes
Originator: 4 bytes (IP address)
Original Metric: 4 bytes
Sub-TLVs (to be defined)
The "Flags" field can be used to:
specify if prefix is internal or external (redistributed)
specify if prefix should avoid summarization.

Accordingly when an IS-IS router originates a prefix it creates a TLV-135 to be inserted in the router LSP containing the prefix and metric, and the subTLV is included with the additional information such as originator-ID and link-ID desired to be propagated across levels or areas. Accordingly when any other router in the network has to propagate or leak such a prefix to another level it will do so for the whole TLV-135 including the subTLV.

It will be appreciated that the approach can be applied equivalently according to protocol. For example in the case of OSPF routing information encoding is managed in a different manner than for IS-IS. In particular instead of a TLV, an opaque-LSA can carry the additional information. The formulation and implementation of opaque-LSA will be familiar to the skilled reader and is described in "the OSPF opaque option" which is available at the time of writing on the file "rfc2370.txt" in the directory "rfc" of the domain "ietf.org" of the World Wide Web, and which is not therefore described in detail herein. However the opaque-LSA can be used to propagate originator-ID and link-ID for any IP prefix. At the time a prefix is encoded in the opaque-LSA, it is necessary to know the scope of the IP prefix. For prefixes that need to be advertised throughout the area, type-10 opaque-LSAs can be used. For prefixes that need to be advertised throughout the routing domain or AS, type-11 opaque-LSAs can be used.

It will be noted that the core TM can be defined at different possible levels of granularity, point of presence (PoP) to PoP, router to router or link to link where both the ingress and egress link of the outgoing router are characterized, as appropriate, or indeed at any other appropriate level of granularity.

4.0 Implementation Mechanisms—Hardware Overview

Figure 4:
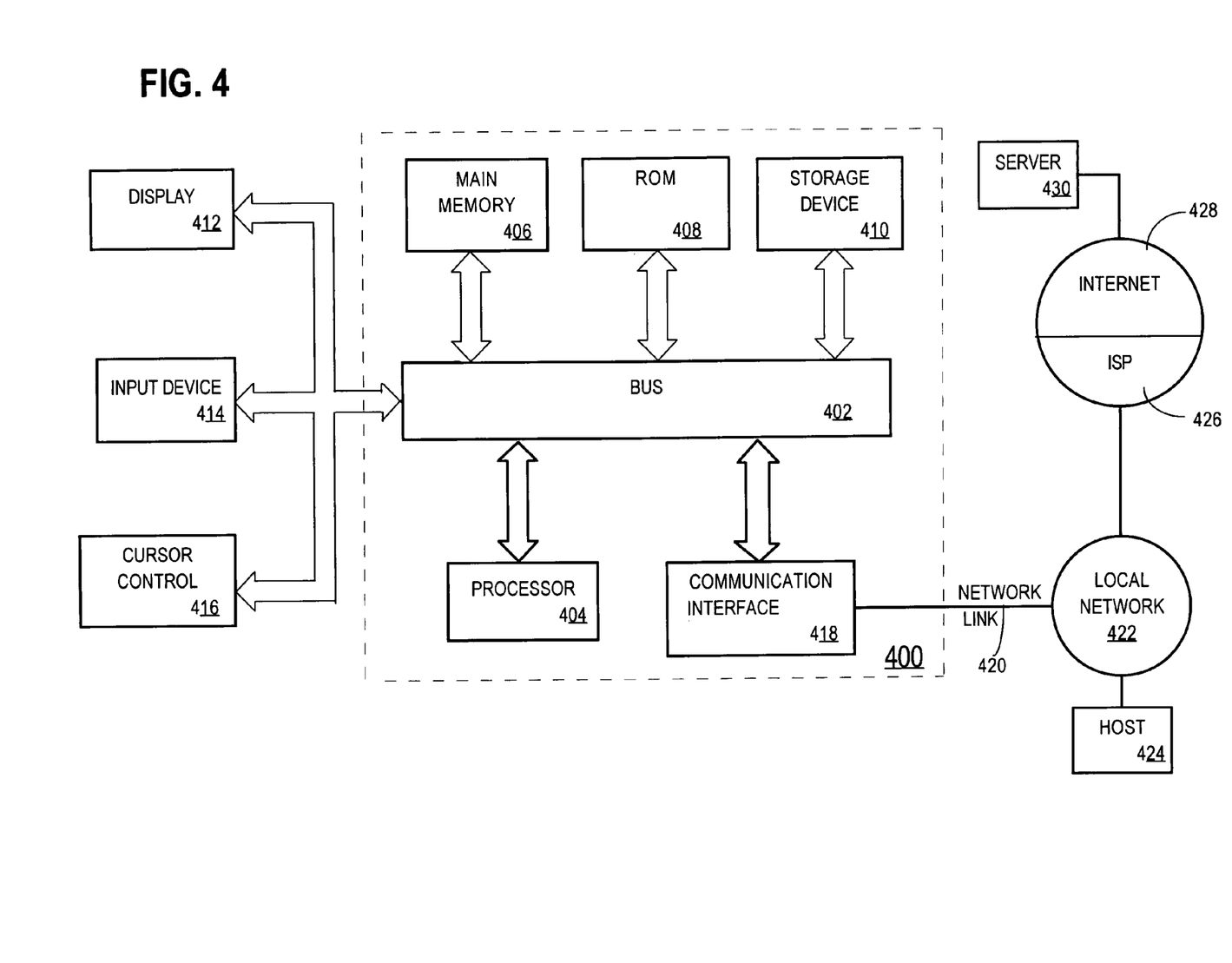
FIG. 4 is a block diagram that illustrates a computer system on which a method of managing a transition between topologies may be implemented.

FIG. 4 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as an identifying or notifying node the above described method of managing a topology transition. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. Aspects from the examples and embodiments described can be juxtaposed or interchanged as appropriate.

It will be appreciated that the additional adjacency information can be implemented in any system employing a notification of adjacency, for example in link state protocols such as IS-IS or OSPF in which the adjacency information is included in an LSP. The method described herein can be applied to any network topology, of any complexity or size, and to a topology including any number of areas or levels. The invention applies to any manner of incorporating the adjacency information into an LSP under any appropriate protocol, for example IPv4 or IPv6.

What is claimed is:

1. A method of identifying an egress point to a network location in a data communications network comprising a plurality of nodes and links therebetween, comprising the steps, performed at an identifying node, of:
   receiving a notification flooded through the network advertising an adjacency to a network location;
   wherein the notification advertising the adjacency to the network location includes adjacency information comprising at least one of a notifying node identifier and a link identifier to the network location, and wherein the notification was flooded through the network;
   deriving, from the notification, the adjacency information; and
   identifying, from the adjacency information, the egress point;

wherein the notification comprises a link state packet (LSP);

wherein the method is performed by one or more processors.

2. A method as claimed in claim 1 in which the egress point comprises the notifying node.

3. A method as claimed in claim 1 in which the egress point comprises a link.

4. A method as claimed in claim 1 in which the network location comprises a prefix.

5. A method as claimed in claim 1 in which the network is an interior gateway protocol (IGP) network.

6. A method as claimed in claim 5 in which the IGP is intermediate system-intermediate system (IS-IS) and the adjacency information is stored in a type length value (TLV).

7. A method as claimed in claim 5 in which the IGP is open shortest path first (OSPF) and the adjacency information is stored in an opaque link state advertisement (LSA).

8. A method as claimed in claim 1, further comprising deriving traffic flow information using the identified egress point.

9. A method as claimed in claim 8 further comprising implementing at least one of the group of capacity planning, traffic engineering or destination sensitive billing based on the derived traffic flow information.

10. A method as claimed in claim 9 comprising implementing destination sensitive billing and further comprising the steps of:
 identifying traffic per egress point; and
 billing traffic dependent on egress point.

11. A method as claimed in claim 10 in which traffic billing is dependent on egress point geographic location.

12. A non-transitory computer readable storage medium comprising one or more sequences of instructions for identifying an egress point to a network location which, when executed by one or more processors, cause the one or more processors to perform the steps of:
 receiving a notification flooded through the network advertising an adjacency to a network location;
 wherein the notification advertising the adjacency to the network location includes adjacency information comprising at least one of a notifying node identifier and a link identifier to the network location, and wherein the notification was flooded through the network;
 deriving, from the notification, the adjacency information; and
 identifying, from the adjacency information, the egress point;
 wherein the notification comprises a link state packet (LSP).

13. An apparatus for identifying an egress point to a network location in a data communications network comprising a plurality of nodes and links therebetween comprising:
 one or more processors;
 means for receiving a notification flooded through the network advertising an adjacency to a network location;
 wherein the notification advertising the adjacency to the network location includes adjacency information comprising at least one of a notifying node identifier and a link identifier to the network location, and wherein the notification was flooded through the network;
 means for deriving, from the notification, the adjacency information; and
 means for identifying, from the adjacency information, the egress point;
 wherein the notification comprises a link state packet (LSP).

14. An apparatus as claimed in claim 13 in which the egress point comprises the notifying node.

15. An apparatus as claimed in claim 13 in which the egress point comprises a link.

16. An apparatus as claimed in claim 13 in which the network location comprises a prefix.

17. An apparatus as claimed in claim 13 in which the network is an interior gateway protocol (IGP) network.

18. An apparatus as claimed in claim 17 in which the IGP is intermediate system-intermediate system (IS-IS) and the adjacency information is stored in a type length value (TLV).

19. An apparatus as claimed in claim 17 in which the IGP is open shortest path first (OSPF) and the adjacency information is stored in an opaque link state advertisement (LSA).

20. An apparatus as claimed in claim 13, further comprising means for deriving traffic flow information using the identified egress point.

21. An apparatus as claimed in claim 20 further comprising means for implementing capacity planning, traffic engineering or destination sensitive billing based on the derived traffic flow information.

22. An apparatus as claimed in claim 21 comprising means for implementing destination sensitive billing and further comprising:
 means for identifying traffic per egress point; and
 means for billing traffic dependent on egress point.

23. An apparatus as claimed in claim 22 in which traffic billing is dependent on egress point geographic location.

24. An apparatus for identifying a network egress point, the apparatus comprising:
 one or more processors; and
 a network interface communicatively coupled to the one or more processors and configured to communicate one or more packet flows among the one or more processors in a network and a non-transitory computer readable storage medium comprising one or more sequences of instructions for identifying an egress point to a network location which, when executed by one or more processors, cause the one or more processors to perform the steps of the method of:
 receiving a notification flooded through the network advertising an adjacency to a network location;
 wherein the notification advertising the adjacency to the network location includes adjacency information comprising at least one of a notifying node identifier and a link identifier to the network location, and wherein the notification was flooded through the network;
 deriving, from the notification, the adjacency information; and
 identifying, from the adjacency information, the egress point;
 wherein the notification comprises a link state packet (LSP).

25. A method of identifying an egress point to a network location in a data communications network comprising a plurality of nodes and links therebetween, comprising the steps, performed at a notifying node, of:
 creating a notification advertising an adjacency to a network location including adjacency information comprising at least one of a notifying node identifier and a link identifier to the network location; and
 flooding the notification through the network so other nodes can derive, form the notification, the adjacency information and identify, from the adjacency information, the egress point;
 wherein the notification comprises a link state packet (LSP);

wherein the method is performed by one or more processors.

26. A non-transitory computer readable storage medium as claimed in claim 12 in which the egress point comprises the notifying node.

27. A non-transitory computer readable storage medium as claimed in claim 12 in which the egress point comprises a link.

28. A non-transitory computer readable storage medium as claimed in claim 12 in which the network location comprises a prefix.

29. A non-transitory computer readable storage medium as claimed in claim 12 in which the network is an interior gateway protocol (IGP) network.

30. An apparatus as claimed in claim 24 in which the egress point comprises the notifying node.

31. An apparatus as claimed in claim 24 in which the egress point comprises a link.

32. An apparatus as claimed in claim 24 in which the network location comprises a prefix.

33. An apparatus as claimed in claim 24 in which the network is an interior gateway protocol (IGP) network.

34. A method as claimed in claim 25 in which the egress point comprises the notifying node.

35. A method as claimed in claim 25 in which the egress point comprises a link.

36. A method as claimed in claim 25 in which the network location comprises a prefix.

37. A method as claimed in claim 25 in which the network is an interior gateway protocol (IGP) network.

* * * * *